March 1, 1949. W. W. HALLINAN 2,463,031
UNIT HEATER AND CONTROLLING DEVICE THEREFOR
Filed Oct. 29, 1945
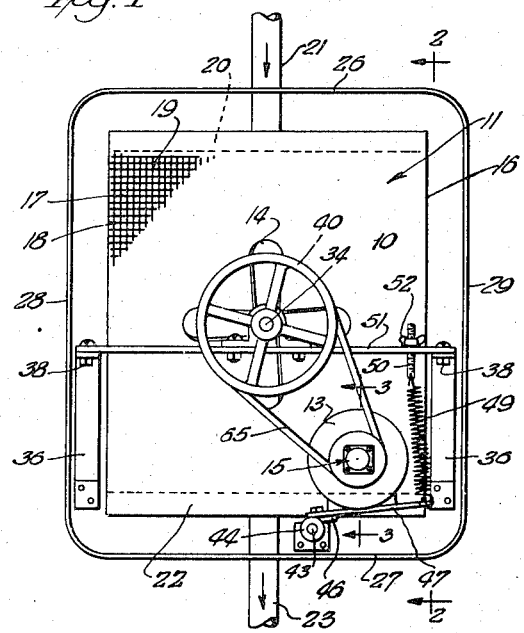
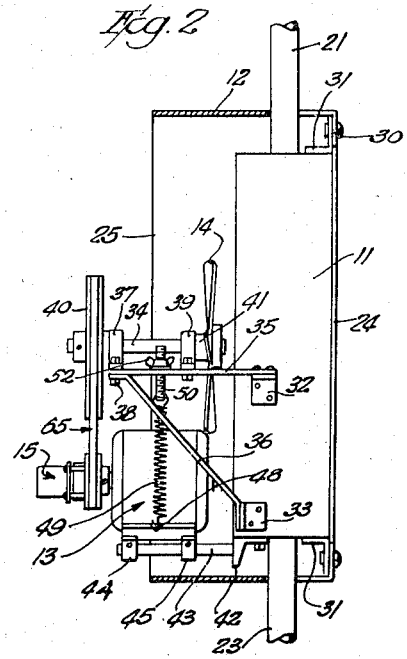
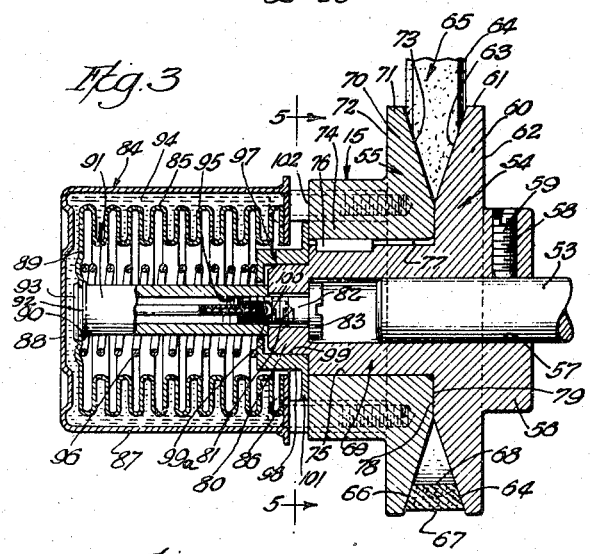
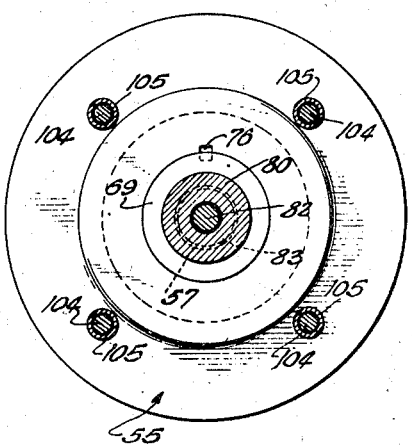
Inventor
William W. Hallinan
Robert H. Wendt
Attys.

Patented Mar. 1, 1949

2,463,031

UNITED STATES PATENT OFFICE 2,463,031

UNIT HEATER AND CONTROLLING DEVICE THEREFOR

William W. Hallinan, Racine, Wis.

Application October 29, 1945, Serial No. 625,295

1 Claim. (Cl. 74—230.17)

The present invention relates to unit heaters and controlling devices therefor, and is particularly concerned with the provision of an improved heater assembly including means for regulating the passage of air through the core of the unit heater in such manner that the temperature of the space to be heated by the unit heater is automatically regulated.

One of the objects of the invention is the provision of a unit heater assembly provided with a heat conducting core through which the heating medium passes, and having air passages through the core, through which air is impelled by means of a suitable fan, the fan being driven at a speed which is regulated by the temperature of the air returning to the unit heater from the space to be heated so that, although the unit heater may be kept at substantially constant temperature, and the driving motor may be driven at substantially constant speed, the amount of heat which is distributed depends upon the necessity for heat to maintain the temperature at a predetermined substantially constant value.

Another object of the invention is the provision of an improved controlling device for unit heaters by means of which the air to be heated may be driven through the air spaces in the core of the unit heater at a speed which may be varied by infinitely small increments, depending upon the temperature of the air which is being heated so that the fan is driven faster when the air is cooler and slower when the air becomes warmer and approaches a predetermined temperature.

Another object of the invention is the provision of an improved variable diameter pulley which is thermostatically controlled and which is adapted to have its effective diameter decreased as the temperature of the air impinging on the thermostat increases and to have its diameter increased as the temperature of the air impinging upon the thermostat decreases.

Another object of the invention is the provision of an improved thermostatic pulley of the class described, all of the movable parts of which are suitably enclosed and axially mounted for rotation with the pulley so that there is no necessity for rotating fluid-tight connections and so that the pulley may be constructed with its thermostatic controlling device as a unit.

Another object of the invention is the provision of a thermostatically controlled variable diameter pulley of the class described which is statically and dynamically balanced about the axis of rotation of the pulley, which is sturdy, and which is adapted to be manufactured at a low cost and adapted to be used for a long period of time without necessity for adjustment or replacement or repair of any of its parts.

Another object of the invention is the provision of an improved controlling system for controlling the distribution of heated air from the unit heater so that the spaces to be heated may be kept at substantially constant temperature without necessity for any other controlling devices than that embodied in the present system.

Another object of the invention is the provision of a device for use in connection with a hot air heating system, which will permit the use of a constant speed motor, but which will cause a variation in the rate of rotation of the blower, dependent upon variations in the temperature of air returning to the blower by way of a return air conduit or otherwise.

Another object of the present invention is to provide a device which may be attached to existing structures when a motor and blower are used in connection with the operation of a hot air heating system, so that the system may be changed over without extensive modifications in the construction thereof.

Another object of the invention is the provision of a change-speed device of the class described which is adapted to be interposed between the blower and its driving motor, and which is operated by a thermally responsive device that is interposed in the path of the current of air which may be flowing in a cold air return duct or which may return to the device by circulation in the room.

Another object of the invention is the provision of an improved device of the class described, in which the temperature responsive device and the change speed device are so interconnected that, as the returning air becomes colder, greater volume is caused to be circulated by the fan past the source of heat, and as the temperature of the returning air increases, the volume circulated is correspondingly reduced.

A more specific object of the present invention is to provide an improved thermally responsive change-speed device which will react to small variations in the temperature with a high degree of accuracy.

This is preferably accomplished by mounting a temperature responsive device directly on a rotary part of a change-speed unit and directly in the path of a moving current of air flowing to the source of heat so that there is a circulation of air around the thermal unit at all times.

Other objects and advantages of the invention will be apparent from the following description and the accompanying drawings, in which similar characters of reference indicate similar parts throughout the several views.

Referring to the single sheet of drawings accompanying this specification:

Fig. 1 is a rear elevational view of a unit heater assembly constructed according to the invention, the rear side being that in which the air enters the core;

Fig. 2 is a vertical sectional view showing the motor, pulley, fan, and core in elevation, and taken on the plane of the line 2—2 of Fig. 1, looking in the direction of the arrows;

Fig. 3 is a fragmentary sectional view taken on the plane of the line 3—3 of Fig. 1, showing the details of construction of the thermostatically controlled variable diameter pulley, with the parts in the position which they assume when the pulley has its maximum diameter;

Fig. 4 is another fragmentary sectional view, similar to Fig. 3, showing parts of the thermostat and pulley, with the pulley in the position which the parts assume as the diameter of the pulley diminishes with increasing temperature of the air impinging on the thermostat; and Fig. 5 is a vertical sectional view, taken on the plane of the line 5—5 of Fig. 3.

Referring to Figs. 1 and 2, 10 indicates in its entirety the unit heater assembly, which includes the unit heater 11, a suitable housing 12, an electric motor 13, a fan 14, and thermostatically controlled variable diameter pulley 15.

The unit heater preferably comprises a suitable frame 16, such as a rectangular frame of sheet metal, which supports the metal core 17 having transverse apertures 18 for passing air and having vertical conduits 19, indicated diagrammatically by lines in Fig. 1 for passing a heating medium.

The conduits 19 communicate with a header conduit 20, which in turn communicates with the inlet 21, and in a similar manner there is a header conduit 22 at the bottom, communicating with an outlet conduit 23.

The unit heater may be of any desired type, utilizing any of many different heating mediums; but it is preferably of the steam heater type.

Other forms of unit heaters may utilize hot water or some other form of heat carrying liquid, or the unit heater may be of the type which utilizes the heat from gases of combustion from a suitable source of combustion inside the unit heater, in which case there should, of course, be a supply of fuel and air, and a pipe to carry off the gases of combustion.

The direction in which the heat medium flows through the unit heater may be varied, and flow may be aided by convection currents. When steam is employed, however, it is desirable to have the steam enter from the top, this being the hottest part of the core, and the condensate may run out at the bottom through the outlet pipe 23.

The housing 12 preferably comprises a substantially rectangular box-like frame, the front of which may be open at 24 over the full area of the core 17, and the back of which may also be provided with an opening 25. Thus the housing 12 consists of the top 26, bottom 27, and the side walls 28, 29.

The four walls 26—29 are each preferably provided with an inwardly turned face flange 30, which may support a plurality of angle brackets 31 by means of which the unit heater 11 is secured in the housing. Other angle brackets may be carried by the side walls of the unit heater shell 16, for the purpose of supporting the bearings, etc., for the shaft 34, which carries the fan 14. Such brackets are indicated by numerals 32, 33. For example, the bracket 32 may support a horizontally extending strap of metal 35, which may be braced by a diagonally upwardly extending frame member 36 that is secured at its outer end to the bearing 37 and to frame member 35 by bolts 38. A second bearing 39 is carried by horizontal frame member 35 adjacent the fan 14.

The shaft 34 is rotatably mounted in bearings 37, 39 and at its outer end carries a V pulley 40. The inner thrust surface of the hub on V pulley 40 engages the end of bearing 37, and the hub 41 of fan 14 engages the end of bearing 39, thus preventing endwise movement of shaft 34. V pulley 40 and fan 14 are both fixedly secured to shaft 34.

While the fan 14 is shown diagrammatically, any type of blower may be utilized, including various forms of more efficient fan blades and centrifugal blowers.

The unit heater frame 16 also preferably supports at its lower side a suitable bracket 42 provided with a horizontally extending shaft 43 serving as a support for the motor 13. The shaft 43 may carry a pair of hinge members 44, 45 in the nature of strap hinges, the attaching flange 46 of each hinge being secured to the motor base 47. The motor base is extended on the side of the motor, opposite to the hinges 44, 45, where it is provided with a centrally located aperture 48 for engagement with a tension coil spring 49.

The upper end of the coil spring is hooked in an aperture in a stud bolt 50, which bolt passes through an aperture in a horizontal frame member 51 carried by the frame members 35. The bolt 50 is provided with a thumb nut 52 so that the tension of spring 49 may be adjusted by means of nut 52.

The motor 13 is preferably of the constant speed type and preferably of the type which does not cause radio interference, such as, for example, an induction motor; and its shaft 53 supports the thermostatically controlled variable pulley 15.

The pulley proper consists of two separable parts, the relatively fixed part 54 and the movable part 55, both of which rotate with the shaft 53. The fixed part 54 of the pulley member comprises a suitable hub 56 provided with a through bore 57 adapted to receive a shaft 53; and the hub 56 preferably has a threaded bore 58 for receiving a set screw 59 whereby the pulley part 54 is fixedly secured to shaft 53.

The hub 56 supports a radially extending pulley flange 60, which may have a circular periphery 61 and a plane inner surface 62. On the side toward the pulley part 55 the flange 60 is preferably provided with a substantially frusto-conical surface 63 adapted to engage one of the side faces 64 of a V belt 65.

The V belt is, of course, not accurately V shaped in cross section, but is substantially trapezoidal. Its side surfaces 64 and 66 taper inwardly on the pulley, and its outer and inner surfaces 67, 68 are curved. Any form of suitable wedge-shaped belt may be employed, the belt preferably being constructed of resilient material, such as rubber, reinforced with fabric, or rubber substitutes, such as that which appears on the market under the trade name of Duprene.

The pulley part 54 is provided on its side opposite to the hub 56 with a smaller, elongated hub 69 for slidably supporting the pulley part 55. The movable pulley part 55 is also provided with a radially extending flange 70, having a circular periphery 71 and an annular plane outer surface 72.

Its surface opposing the pulley part 54 is also substantially a frusto-conical surface 73, the taper corresponding substantially to that of the belt 65 which is to be used with the pulley.

The pulley part 55 also has a substantially cylindrical hub 74 provided with a through bore 75 adapted to receive the elongated hub 69 of the pulley part 54. The hub 69 may have a slot for a key member 76, and bore 75 of hub 74 may have an elongated slot 77 within which the key member 76 slides. Thus the pulley member 55 is mounted for sliding movement on the hub 69 of the pulley part 54, but relative rotation is prevented by the key and key-way 76, 77.

The flanges 60 and 70 may be provided with annular plane surfaces 78, 79, respectively, at the inner border of the frusto-conical surfaces 63, 73. The engagement of these annular surfaces determines the position of the pulley parts at maximum diameter, as shown in Fig. 3.

At its outer end the hub 69 is preferably provided with a substantially cylindrical extension 80, which has a through bore 81 for receiving screw bolt 82. The head 83 of the screw bolt 82 is received in the bore 57, which receives shaft 53.

The thermostatically controlled pulley 15 is preferably mounted on the motor shaft, and the driven pulley 40 on the fan shaft is preferably larger, since desirable motors usually drive at a faster speed than that at which the fan 14 is preferably operated.

Furthermore, the smaller pulley is preferably the one which is thermostatically controlled, as thus a wider variation in speed can be secured with a predetermined amount of movement of the thermostat. However, in some embodiments of the invention the thermostatic pulley may be the driven pulley, carried by the fan shaft.

The thermostat assembly 84 preferably includes an extensible and expansible metal member, such as a metal bellows 85, the inner end of which is brazed or soldered to the inwardly extending rectangular wall 86 of the thermostat housing 87, providing a fluid-tight joint between the bellows 85 and the wall 86 at this point.

The wall 86 extends outwardly from the bellows, and is fixedly secured to the cylindrical housing wall 87, which is provided with a closed end wall 88. The left end of the bellows 85 (Fig. 3) is provided with a closed end wall 89, which has a centrally located aperture 90 for receiving a stub shaft 91.

The stub shaft 91 has an annular shoulder 92 inside the end wall 89, and an annular shoulder 93 outside the end wall. Thus the end wall 89 has a fluid-tight joint with the stub shaft 91 by being clamped between the annular portions 92, 93, which are spun over into engagement with the end wall 89.

By having the bellows 85 extend into the housing 84 the chamber 94 for the expansible medium in the thermostat is reduced in size, and a lesser amount of the expansible medium may be employed. Various types of expansible gases, fluids, and plastic solids may be utilized to fill the space 94.

For an air conditioning installation I prefer to charge the bellows with a refrigerant, such as, for example, Freon F11. Other refrigerants may be used to provide a suitable range of temperature actuation, such as, for example, ethyl chloride, methyl chloride, alcohol, or ethyl ether.

The inner end of the stub shaft 91 is provided with a threaded bore 95 for receiving the threaded end of the bolt 82. Thus the stub shaft 91 may be clamped to the end of the reduced hub 80 by the bolt 82 in axial position. Access may be had to the kerf in the head 83 of bolt 82 through the bore 57 before the pulley is attached to the shaft 53.

The bellows 85 preferably houses a helical compression spring 96, one end of which engages a suitable groove in the end wall 89, and the other end of which engages a thrust transmitting member 97. This thrust transmitting member 97 may consist of a hat shaped metal cap, the cylindrical wall 98 of which has a bore 99 for sliding movement on a reduced hub 80.

The cylindrical wall 98 carries an inwardly extending end flange 99a, providing a seat for the spring 96, and having a bore 100 for passing the stub shaft 91. Thus the spring reacts against the thrust member 97 instead of the fixed hub 80.

At its opposite end the cylindrical body 98 supports a radially extending annular flange 101, which is of sufficient width to extend beyond the periphery of hub 69 into engagement with the annular end surface 102 of the hub 74.

The hub 74 projects axially sufficiently so that it is at least as long as the hub 69. The spring 96 is thus adapted to urge the relatively movable pulley members 54, 55 toward each other into position of maximum diameter, as shown in Fig. 3.

The wall member 86 of the thermostatic housing 84 is preferably rectangular in shape, so that it projects at its four corners, beyond the cylindrical wall 87. These projecting portions are provided with bores 103 for receiving the screw bolts 104, which secure the thermostat assembly 84 to the movable pulley member 55.

Due to the length of the hub 74 the bolts 104 are of sufficient length to support the thermostat assembly 84 beyond the end of hub 74, and these bolts are thus preferably provided with tubular spacers 105 that are clamped between the flange 86 and the flange 70 of movable pulley member 55.

The flange 70 is provided with the threaded bores 106 for receiving the screw bolts 104 by means of which the housing member 84 of the thermostat is fixedly secured to the movable pulley member 55.

The operation of the thermostatically controlled pulley is as follows: When the thermostat 84 is at a predetermined cool temperature, such as, for example fifteen degrees F. below room temperature, the contraction of the thermostat and the action of the spring 96 moves the parts to the position of maximum diameter, shown in Fig. 3.

Then the belt 65 rides in the groove defined by surfaces 63, 73 at a point near the periphery of the flanges 60 and 70; and assuming the motor rotates at substantially constant speed, the fan 14 is driven at maximum speed. This is the condition when the heat is needed in the room supposed to be heated, the heat being distributed by the fan 14 and derived from the unit heater 11.

Even when the core of a unit heater is hot, the unit heater liberates very little heat except when the fan is in operation; and if the fan is driven at a low speed, only a small amount of heat will come from the heater, while at full speed of the fan the maximum heater capacity will be obtained.

Maximum heater capacity should be utilized when the room is cool, and minimum heater capacity should be utilized when the room is at desired temperature or near desired temperature. At intermediate points the heater capacity utilized should be of an intermediate amount.

When the room is cool, therefore, and the pulley 15 is at its maximum diameter, as shown in Fig. 3, it drives the pulley 40 and fan 14 at maximum speed. The cold air comes into the heater housing 12 at the left end (Fig. 2) and impinges upon the thermostat housing 84, and therefore the fan will continue to be driven at top speed until the air in the room begins to become warmer.

As all of the air in the room warms up, warmer air will be drawn to the unit heater air inlet 25 and will impinge upon the thermostatic housing 84. The heat will be transmitted to the expansible medium 94, which will expand; since the outer housing 84 is relatively non-expansible, any expansion that must take place will be in the nature of a contraction of the bellows 85, increasing the size of the chamber 94 at the end space 101 (Fig. 4).

The end 89 of the bellows is fixedly mounted on the fixed hubs 60 and 69. Therefore, the expansion will move the end wall 88 of the outer housing toward the left in Fig. 3 to the position shown in Fig. 4; and since this housing is fixedly secured to the movable pulley member 55 by bolts 104, movable member 55 will be drawn away from the fixed member 54 to the position shown in Fig. 4.

Thus, expansion of the thermostatically expansible medium involves a collapse of the bellows and a spreading of the pulley members. Spreading of the pulley members causes the V belt 65 to ride down farther into the groove, which is defined by surfaces 63, 73, giving it a smaller effective diameter. The diameter of the larger pulley 40 remaining constant, and the speed of rotation of the motor 13 remaining constant, the smaller pulley of Fig. 4 drives the fan at a reduced speed, and the proportions of the parts may be such that when the room has reached a desired temperature the fan 14 is driven at such a low speed that only a small amount of heat is derived from the unit heater, such as, for example, enough heat to replace the losses which are caused by leakage through the walls and ceiling and through the opening of doors and windows.

Thus the output of a unit heater may be varied in accordance with the demands of heat of the room to be heated, and only sufficient heat taken from the unit heater as is required to keep the room at a proper predetermined temperature.

Each room of a heating plant may be provided with such a unit heater deriving its heat from the steam or hot water from the boiler, and each room may be kept at the predetermined temperature for which the variable diameter pulley member is adjusted.

The force exerted upon the bellows 85 to contract it and expand the space 106 by the thermostatic medium 94 is greater than that exerted by the spring 96 so that it compresses the spring 96.

Furthermore, as the diameter of the pulley comprising the members 54, 55 decreases, there will be a greater space between the centers of the driving and driven shafts, and there would be slack in the belt 65, if there were not some provision for taking up this slack. The slack is taken up by downward clockwise movement of the motor 13 pivoting on the shaft 43.

The weight of the motor, however, is apt to be so great that it might tend to cause the belt to spread the pulleys. Therefore, the spring 49 is utilized to support a portion of the weight of the motor. Adjustment of this balancing spring also determines, at least partially, the expansion and contraction of the pulley.

It will thus be observed that I have invented an improved heating system for utilizing unit heaters whereby the output from the unit heater decreases as the room temperature increases. If the room temperature drops, the effective speed of the fan, and the output of the unit heater will be increased accordingly.

The present device is thus adapted to be mounted as a unitary structure within a return air duct of a warm air heating furnace or in position, as shown, to be responsive to the air which is returning to the unit heater.

The foregoing arrangement is effective to permit the use of a constantly operating motor and the variable operation of a blower consequent upon variations of temperature in the return air. Thus, any drop in the temperature of the returning air is reflected at once in an increased circulation so as to send additional heat into the room to be heated. When the present device is used with a heating furnace, it is to be understood that the heating furnace is equipped with the customary damper control apparatus under the influence either of the temperature of the air in the furnace bonnet, or in one of the rooms to be heated, so as to vary the rate of combustion within the furnace in accordance with the demand for heat in the room to be heated.

The thermostat of the pulley can be charged with various materials which will bring the pulley to low speed at predetermined room temperatures; and in this manner a structure having a multiplicity of different rooms can be automatically heated by merely having the proper thermostats on each pulley to drive the fan on each heater at the correct speed to maintain the desired temperature in the particular rooms or compartments where the heaters are located.

Such room temperatures may vary anywhere from 40 degrees Fahrenheit to 150 degrees Fahrenheit, or more or less. The effectiveness of unit heaters is greatly increased by utilization of my heating system and my variable diameter thermostatic pulley. There will be no overheating by the running of the fan at high speed after the room has reached this desired temperature, and in colder weather the increased losses of heat from the building result in diminished temperatures inside, which automatically cause the unit heater to distribute more heat until the rooms reach the proper desired temperature.

While I have illustrated a preferred embodiment of my invention, many modifications may be made without departing from the spirit of the invention, and I do not wish to be limited to the precise details of construction set forth, but desire to avail myself of all changes within the scope of the appended claim.

Having thus described my invention, what I claim as new and desire to secure by Letters Patent of the United States is:

In a thermostatically controlled variable diameter pulley, the combination of a fixed pulley section provided with a hub and with a bore for receiving a shaft, said hub having an external cylindrical surface and having a radially extending flange provided with a frusto-conical surface forming one side of a V groove, a movable pulley section having a cylindrical bore for slidably receiving said hub, and having a radial flange provided with an opposed frusto-conical surface forming the other side of a V groove for a pulley, said hub being provided with an extension having a smaller counterbore, a thermostat comprising a rectangular metal plate, and a plurality of bolts located at the corners of the plate for securing said thermostat to said movable pulley section, said plate supporting a cylindrical container forming a part of said thermostat and provided with a closed end, said plate having a central circular aperture, a bellows having its open end secured to the side of said plate, said bellows forming another part of said thermostat substantially filling said cylindrical container, and having its opposite end closed and secured to a cylindrical column, said column having a threaded bore at its end, and a single screw bolt having its head in the first-mentioned bore, and having a shank in the counterbore, said screw bolt being threaded into the end of said column to secure said column to said fixed pulley section, expansion of said bellows diminishing the size of the chamber in said cylindrical container, and a filling of volatile refrigerant between the inside of said container and the outside of said bellows thermostat, the heating of said thermostat causing said pulley sections to separate.

WILLIAM W. HALLINAN.

REFERENCES CITED

The following references are of record in the file of this patent:

UNITED STATES PATENTS

| Number | Name | Date |
| --- | --- | --- |
| 908,797 | McKeown | Jan. 5, 1909 |
| 1,992,155 | Dillman | Feb. 19, 1935 |
| 2,102,354 | Chambers | Dec. 14, 1937 |
| 2,308,655 | Hallinan | Jan. 19, 1943 |